Oct. 16, 1956 — W. KOBER — 2,767,368
DYNAMOELECTRIC CONTROL

Filed Dec. 21, 1950 — 4 Sheets-Sheet 1

INVENTOR.
William Kober,
BY
Beau, Brooks, Buckley & Beau,
ATTORNEYS.

Oct. 16, 1956 W. KOBER 2,767,368
DYNAMOELECTRIC CONTROL
Filed Dec. 21, 1950 4 Sheets-Sheet 2

INVENTOR.
William Kober
BY
Bean, Brooks, Buckley & Bean.
ATTORNEYS

Oct. 16, 1956 W. KOBER 2,767,368
DYNAMOELECTRIC CONTROL
Filed Dec. 21, 1950 4 Sheets-Sheet 3

INVENTOR.
William Kober
BY
Bean, Brooks, Buckley & Bean.
ATTORNEYS

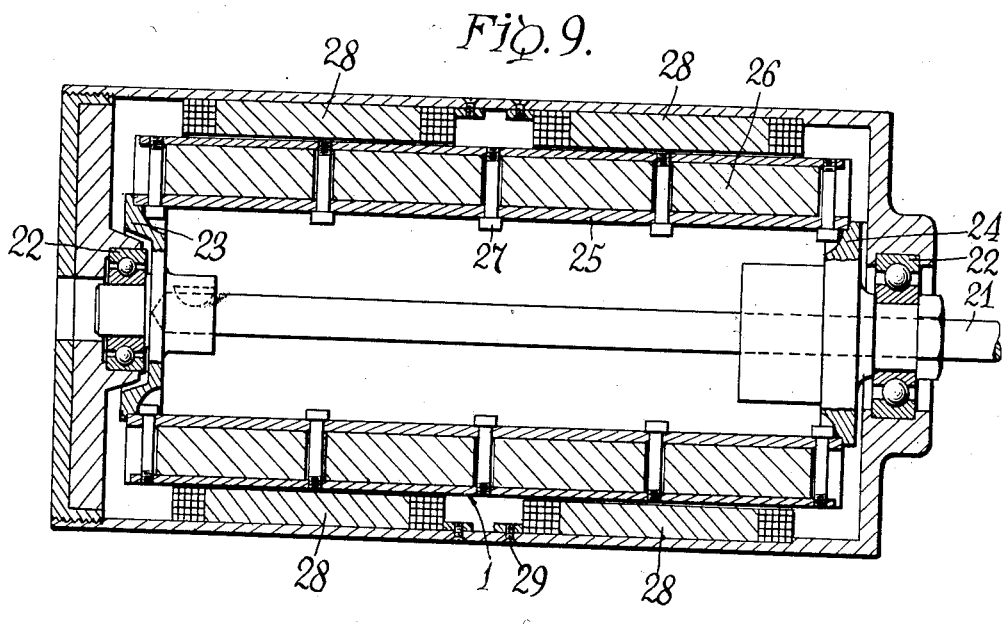
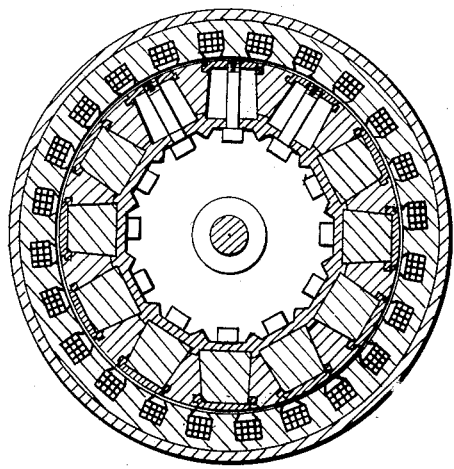
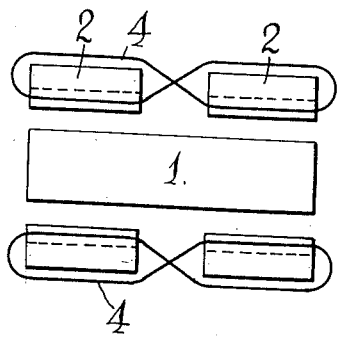

United States Patent Office 2,767,368
Patented Oct. 16, 1956

2,767,368

DYNAMOELECTRIC CONTROL

William Kober, Fairport, N. Y.

Application December 21, 1950, Serial No. 201,926

8 Claims. (Cl. 322—57)

It is an object of this invention to provide a means of controlling the voltage of a generator, in particular, when the generator's field structure is not a part of the regulating means.

It is therefore a particular object of this invention to provide a means of controlling the voltage of a generator using a permanent magnet field.

It is an object of this invention to control the generator voltage over a large range, substantially over the full output voltage of the generator.

It is an object of this invention to control the generator voltage by means of a reltaively low power supply of direct current, said supply being under control of a voltage regulating device substantially such as is used in the art of electromagnetically excited field-controlled generators.

It is an object of this invention to control the generator voltage, by means of a relatively low power supply of alternating current, said supply being under the control of a voltage regulating device.

It is a further object of this invention to control the voltage of a generator without the use of any moving parts in the generator to accomplish this control.

As is well known in the generator art, changes in load current, in load power factor and in the speed of the driving source cause changes in the output voltage of a generator. Most power consuming devices require a relatively constant voltage for proper or even safe operation. Hence, a device for manual or automatic control of the voltage output is of great importance in most generator applications.

In the present state of the art, this voltage control is almost universally provided by controlling the direct current supply used for exciting the generator field. In this way, a relatively low power electrical supply for the generator field is controlled by use of, for example, a rheostat (manual), or by means of a current varying device under control of a device sensitive to the output voltage, and sometimes also to output current and output power factor.

When, however, permanent magnets are used to supply the generator field, the above described control devices are obviously no longer applicable. Attempts have been made to provide such generators with auxiliary current excited windings, but such devices are unsatisfactory for a number of reasons. The high degree of saturation of a high-performance permanent magnet material renders it resistant to change in flux over large changes in magnetomotive force, requiring in fact more ampere turns for a moderate change in voltage than would be required to excite a standard soft iron field structure of ordinary design. Also, no large range of control is ever available, as the auxiliary magneto motive force applied to the magnet cannot be varied over large values without partially demagnetizing the magnets, which causes a permanent reduction in maximum flux and resulting power capacity of the generator. Further, most of the disadvantages of the electromagnet excitation system as compared to permanent magnets are reintroduced, including the space required for the winding, the mechanical problems involved in the support of the winding, and the heat produced therein, requiring a means of ventilation for its dissipation.

It is the object of this invention, therefore, to provide a means of controlling the output voltage of a generator using a permanent magnet field, or other type of fixed excitation, which is applied to the armature only, and which acts by varying a supply of relatively low power D. C. or A. C. under control of a manual or automatic regulator, and the regulator may operate substantially in the same manner as standard regulators in the well developed regulator art.

In the drawing:

Fig. 8 is a schematic diagram illustrating another application of the invention;

Fig. 9 is a longitudinal sectional view of a generator corresponding to the schematic diagram of Fig. 8; and Fig. 10 is a view taken about on line IX—IX of Fig. 9.

Figure 1:
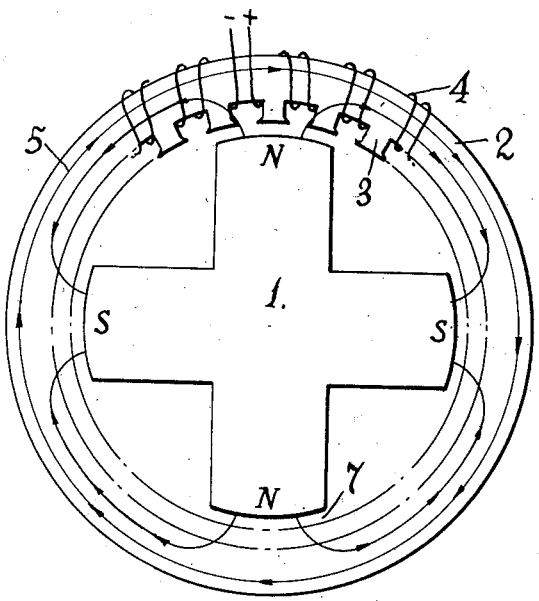
Fig. 1 is a schematic diagram of a generator of the type to which the invention may be applied.
Figure 2:
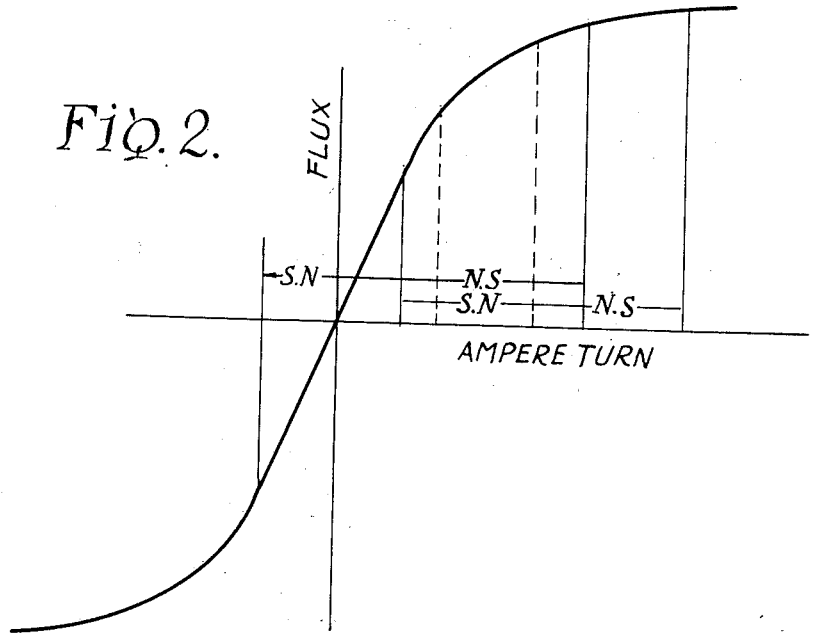
Fig. 2 is a graph showing typical magnetic properties of the armature iron of the generator of Fig. 1.

Fig. 1 shows a schematic diagram of the flux paths 6 in the conventional arrangement of a rotating field alternator, using alternate north and south poles in the field structure 1, and built up laminations 2 with teeth 3 forming the armature structure in which the power generating windings (not shown) are placed in a manner obvious to the art. It will be noted that in the armature, the material behind the teeth carries flux in opposite directions from each pole, always directed from the nearest north pole to the nearest south pole. This flux is zero on the very center of each pole, and reaches a maximum in the spaces between poles. As is well known, the iron of which the armature is composed has a rather definite limit of capacity to transmit flux, and will normally be operated at a point substantially near this limit. A typical curve showing the relation between flux produced and the magnetomotive force in ampere turns is shown in Fig. 2. As will be seen, the magnetic flux produced at first varies rapidly with applied magneto-motive force, then more slowly until soon little flux increase is produced by large increases in magneto motive force. While other considerations, such as hysteresis and eddy current losses are also factors in determining the desired magnetic flux level in the armature, these factors may be ignored in an explanation of the basic operation of this invention.

Fig. 1 also shows the armature having a continuous winding 4 around the back and in the bottom of the slots between the teeth 3. It will be noted that the armature, disregarding the teeth, now forms a continuous ring with a relatively uniform toroidal winding. There is a substantially uniform number of ampere turns for each unit length of the ring, and flux will flow around the ring in the continuous circle shown at 5. The flux flowing will be determined quite accurately from Fig. 2, taking into account the cross-sectional area of the path 2, 5 and the number of ampere turns per unit length provided by the current and the winding 4.

Note that, since the applied magneto-motive force is dissipated very near its origin by the reluctance or resistance of the material to conduct the resulting magnetic flux, no significant external field will be noted at any point.

In the region A, the magneto-motive force of the D. C. stator winding is in the direction shown by the curved, wide angled arrows 5. The magneto-motive force impressed by the field structure (through the air gap 7 and the teeth, shown by path 6 using straight, narrow-angled arrows) is in the region A in the same direction as 5. As noted from Fig. 2, there will be only a small increase in the total magnetic flux in armature path 2 in region A because of the presence of the field structure 1.

In region B, the magneto-motive forces along paths 5 and 6 are opposed. It will be appreciated immediately that path 6 must have produced in it by the field poles S, N a magneto-motive force substantially larger than that of the winding 4 over the length between these poles before the resulting flux can be of reversed direction to that of region A and of substantial magnitude.

Thus, to a rough approximation, very little flux alteration will be produced by the field 1 in the stator path 2 unless the magneto-motive force of the poles N, S is sufficient, in the stator region B, to overcome the magneto-motive force of the winding 4 in this region. It should be emphasized here that the algebraic difference between the flux in the regions A and B is substantially the flux entering the stator teeth per pole, and that the output voltage under a given load and speed condition is proportional to this algebraic difference. An illustrative example can now be given. In Fig. 2 suppose that for the region B, the average mmf. per unit length of the winding 4 is represented by abscissa $d$. Suppose also that under these conditions, the average mmf. per unit length contributed by the poles S, N is the amount and direction S, N. In region A, the winding 4 produces the same value $d$, because of its substantial uniformity, and the field structure N, S the substantially equal but oppositely directed mmf. N, S. Then the ordinate $f$ is the flux in region A, and the ordinate $b$ the flux in region B. The algebraic difference $f-b$ is the effective flux per pole.

When the current in winding 4 is reduced to produce abscissa $c$, the field structure mmf. produces, in a similar way, resultant mmf. abscissa $a$ in region B and abscissa $e$ in region A. The corresponding points $a$ and $e$ on the curve show an algebraic difference of $e-(-a)$, which is obviously much larger than $f-b$. The resultant effect is of course the largest when the current is zero.

Quantitatively, it will be observed that when the control winding mmf., for example $d$, is larger than the field mmf. S, N impressed on the stator through the air gaps and teeth, the resulting flux per pole will be about half or less of the amount when the control winding current is zero, and that from this point a very rapid further reduction in flux per pole results. Hence, the control of flux per pole in this form of the invention, and through it the output voltage, is obviously variable over very wide limits with appropriate changes in control current. It will be noted that large control changes take place when the control winding mmf. in a region such as B, between poles S and N, approximates the effective mmf. produced in the same region of the stator by the field structure. Since the air gap and tooth paths involve losses in mmf. between the poles S, N and region B, and leakage from the armature and the field structures tend to further reduce the useful flux, it is seen that actually a considerably smaller value of control mmf. will perform this result.

It is of interest to note that polarity of the control current has no effect on the operation, and neither has the direction of rotation of the field structure 1.

Thus, it is seen that, on a general comparison the amount of control current, and energy required for a large range of voltage control is comparable to that in an electro-magnetically excited generator, and that no brushes, slip rings or windings need be provided on the field structure to achieve this result. In fact, because of advantages in convenience and space in the winding 4 other field windings, actual gains in both electrical and mechanical design factors result.

In addition, a permanent magnet field generator normally has a smaller voltage change, due to both load and speed changes, whence normally a smaller control range is required. Thus, the invention provides a means for applying output voltage control to a generator through variation of a control current at the cost only of the small winding 4, normally much smaller than the working winding. Not a single one of the advantages of permanent magnet field construction is sacrificed.

The invention is particularly useful in the special class of rotating field alternators, since it applies its control winding to a stationary part. It is also applicable for similar reasons to a rotating field direct current generator, inverter or converter, the procedure involved being obvious to those skilled in the art. In a similar way, the invention makes an excellent speed control for a rotating field D. C. motor. For rotating armature alternators, inverters, converters and D. C. generators and motors, it is also applicable, and in some cases gives the most advantageous result. Here, however, the control is applied to a rotating member, and devices for introducing it to the moving part are required.

Further discussion of the invention is now possible. It will be noted that since the flux 5 produced by the winding 4 is continuous, and does not enter or leave the teeth at any point, that it has no direct effect on the power winding, which is placed in the slots above the control winding 4 in the usual manner. Also, as the field rotates, the field flux moves through the stator, but in so doing, changes in position but not in character. Thus, the control current does not have any direct torque effects on the field. Also, the winding 4 will have no overall voltage induced in it, since the voltage induced in the moving field structure 1 by any flux element of the north pole are cancelled by the equal voltage produced at another point in winding 4 by the corresponding flux element of a south pole. Another point of view on this fact is to consider the winding 4 analogous to the old Gramme ring, in which it is well known that the overall voltage at any point of reentrance of the winding is zero.

In contrast to most saturating control devices, little distortion of the generated wave form is produced by saturation by the control current in winding 4. Since the flux conditions are constant, and merely rotate in position in the stator, a quite different general condition exists than is found in a partially saturating choke or transformer.

It is possible to produce some shift in the flux distribution over say a north pole of the field because of the non-linear response of the region 2 when its flux 5 combines with the flux coming off pole face N into the teeth and so into region 2. However, this effect is reduced by the equalizing effect of the mmf. drop in the air gap, and by tooth drops. In any case, any distortion of flux distribution over a north pole is cancelled by the corresponding oppositely disposed flux distribution over a south pole.

Figure 3:
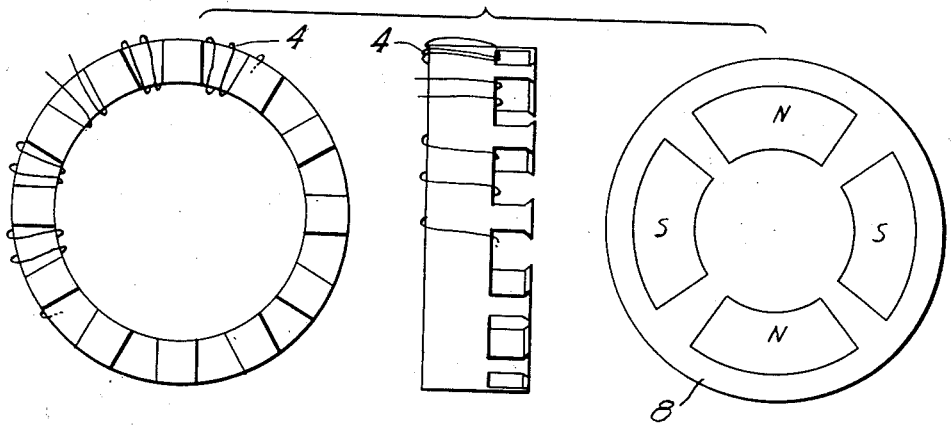
Figs. 3 and 4 are schematic diagrams showing various applications of the invention.

Fig. 3 shows the application of a control winding 4 to an "axial air gap" construction, in which the flux from the field structure passes in and out of the armature teeth on a flat surface. The equivalent 4 pole field is shown at 8. It will be obvious that the change in aspect of the pole face does not affect basic operation of the invention, which remains as above described for the "radial air gap" machine shown in Fig. 1.

If the generator is wound for single phase, it is possible to use an alternating current in the control winding 4. The independence of the circuits involving the working flux, which leaves and enters the field pole faces, and the control flux, which never leaves the armature path 2 (Fig. 1) remains at all values of current in winding 4, and hence remains for alternating current.

However, the effect of the phase of the control current in relation to the voltage produced in the working winding must be examined as now the mmf. in the control circuit varies approximately at the generator synchronous frequency.

Figure 5:
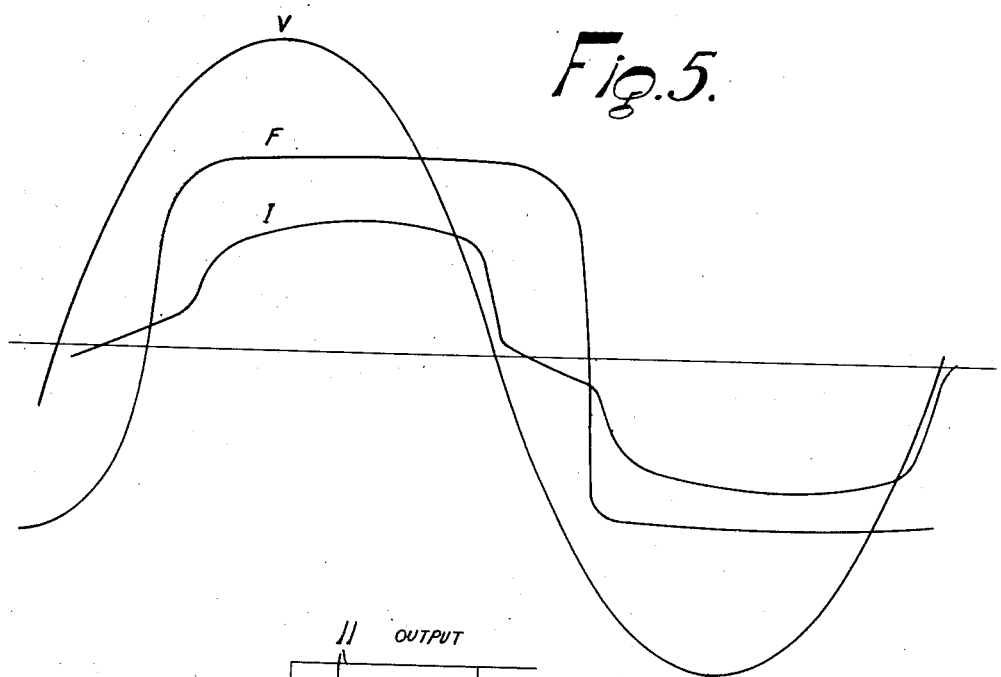
Fig. 5 is a graph explaining an application of the invention.

The optimum timing is such that the maximum voltage produced in the power winding coincides with maximum current in the control winding. The control winding is now a choke coil without an air gap, and a rather complex relation exists between applied voltage, current, and flux. The basic operation is shown in Fig. 5. Here, all curves are for the control winding. V is the terminal voltage; I the current; and F the flux in path 2. It will be seen that while the flux is building up over the region where the iron has high permeability, little current flows. When the iron reaches the bend in the saturation curve, the current increases rapidly, and thereafter has a much flatter top than the original sinusoidal voltage wave. The flux follows the current according to Fig. 2, with the addition of hysteresis factors, which for example make the flux reach zero sometime after the current passes through the zero point.

It will be noted that there is some phase displacement between the voltage and the current. This may be corrected for by introducing phase shifting devices in the circuit from the generator power output voltage to its application through the regulator as control voltage. Alternatively, an auxiliary coil in the generator may be used to supply the power used to operate the control circuit through the regulator, or to supply the necessary voltage to correct the power output voltage in phase.

It will be noted that since the current varies to some extent over the period of a half-cycle, the instantaneous control factor exercised by it on the useful flux per pole varies to some extent. However, the actual flux per pole will remain very nearly constant in permanent magnet field generators, since these always have a low resistance current path around the magnets, which prevent any rapid variations in pole flux. Hence, the above suggested possibility of considerable cross-modulation, tending to distort the generator power output wave form is greatly minimized. Similarly, the effect of phase differences of the control current from the optimum is also greatly reduced.

In the light of the above analysis, it will be seen that even a polyphase power output can be controlled by an alternating current control circuit, the latter being of necessity single phase, without producing serious distortion, although there will be some difference between the phases, depending on the relationship between the phase winding in question and the moment of peak current in the control circuit.

The alternating current control circuit uses relatively higher voltages and currents, because of the back voltages generated by the flux in the included magnetic circuit, and because of hysteresis and eddy current losses in this circuit. It is therefore less efficient than the direct current system described, but has the advantages of eliminating a rectifier in the control circuit, if only the generator's A. C. output is available as a source of control energy.

Figure 4:
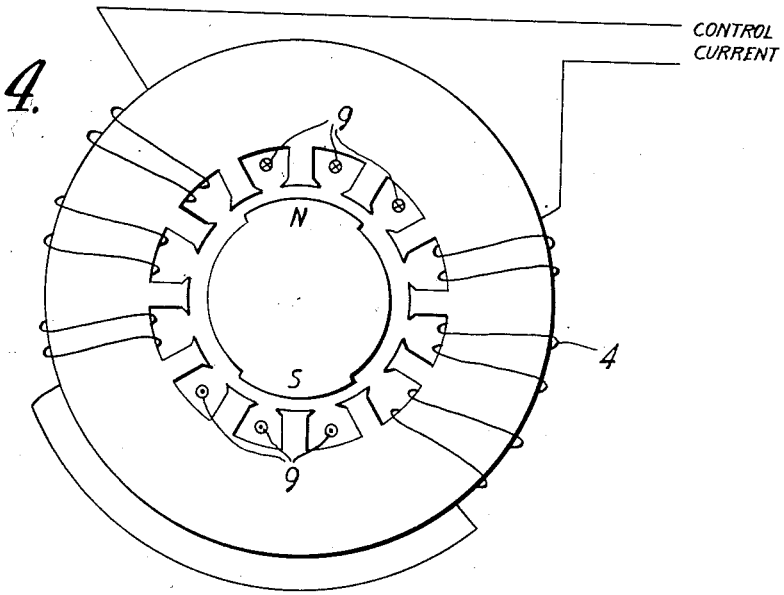

If a single phase generator is required, it is possible to place the control winding entirely in the slots between those containing the conductors of the main winding 9 (Fig. 4). These slots are normally not used at all. This fact applies to both A. C. and D. C. control currents. Cancellation of the main field fluxes 6 still holds in regard to these control windings as it did for the continuous windings 4.

It may be noted that the above treatment, which has been illustrated by a four pole generator for purposes of simplicity (except for Fig. 4 which shows a two pole machine), applies in an obvious way to generators with any desired number of poles.

In applying the above control, it will be noted that a maximum output voltage is obtained when the control current is zero, and the output voltage is reduced as the control current rises. This action has a number of advantages. Thus, at light loads, when little normal heating takes place, the control circuit is at its maximum heating condition. As the load increases, the control circuit loss is reduced, so that in effect, the control circuit loss has disappeared at high loads, and has substantially no effect in increasing heating at these loads. Also, any minor voltage wave form distortions introduced by the control circuit at light loads disappear at the high loads.

Because high generator output voltage, to be corrected downward, is so corrected by a high control current, it becomes possible to secure a very substantial compensation by the use of very simple devices coupling the output voltage directly into the control circuit. Such coupling circuits are part of this invention, as well as regulators of the conventional type already included.

In the circuits between the output voltage and the control winding, any device which produces an output voltage varying more sharply percentage wise than the incoming supply will improve the tendency to produce said substantial correction.

Figure 6:
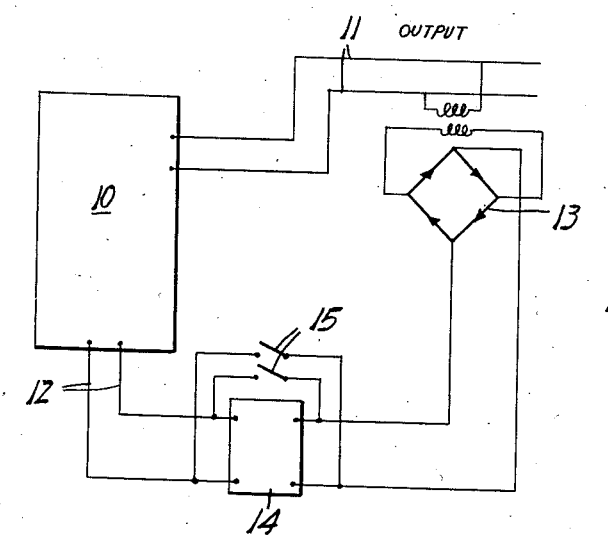
Fig. 6 is a diagram illustrating a circuit used in applying the invention.
Figure 7:
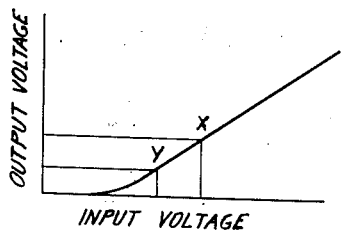
Fig. 7 is a graph illustrating the operation of the circuit of Fig. 6.

Such a circuit is illustrated in Fig. 6 wherein generator 10 has power output 11 and control input 12. Connected through a suitable transformer, the voltage output is passed through full wave dry disc rectifier 13, which supplies the generator control winding 4 through 14 which for this description is shunted out of circuit by switch 15. Dry disc rectifiers have a threshold forward voltage value which must be exceeded before substantial current flows. Fig. 7 illustrates the resulting characteristic. It will be noted that a small percentage input voltage increase YX on the abscissa produces a large percentage output voltage variation YX on the ordinates. Thus, the correcting tendency from output 11 to control input 12 is emphasized. Choice of a much larger number of series disc elements in the rectifier than would be called for by the normal design will further accentuate this desired effect.

Part 14 can also assist in this function if it can supply a nearly constant back voltage. Gas filled two element tubes, such as are used for rectification, and available with hot or cold cathodes are well adapted to this function. For example, such a tube may have a practically constant 10 volt drop at all currents. Very little current will flow in the control circuit when the rectifier output is at 10 volts. A rise to 11 volts, however, will produce an output of one volt, an enormous percentage increase. The figures used are merely illustrative.

Part 14 also can comprise resistors having resistance values varying with temperature, and hence with input voltage including for example series elements which decrease resistance with increased current, and shunt elements which increase resistance with increased current. A large variety of elements having such properties is available; as an illustration, the series elements can be carbon filament lamps and the shunt elements can be tungsten filament lamps.

When drive speed is fairly constant, so that not much frequency change in the output voltage exists, an arrangement of a saturating choke without an air gap, preferably made of very permeable material in the form of a ring, with the winding in toroidal form can be used for this purpose. Such an element will pass practically no current until the applied voltage produces saturation at the flux peaks. At that point, small additional voltages from 11 will produce very sharp increases in the current passed by the choke into the control circuit 12. If it is recalled that the control winding and the armature constitute a coil having many of these properties, it is seen that a direct connection from output 11 to control input 12 in a unit such as Fig. 4 will be partly self regulating. The only departure from the ideal is the somewhat greater saturation normally desired in winding 4, Fig. 4 than in a special separate choke such as 19. In the immediate preceding system, it will be noted also that the control circuit will draw from output 11 sharply increasing low power factor currents, which will also tend normally to reduce output voltage by loading the generator. When a separate choke is used, it may be preferably to use a rectifier, otherwise the two series saturating devices will interfere with each other's characteristics.

In a generator which is relatively long axially, it is often advisable to separate the stator 2 into two or more sections, for purposes of cooling such a generator as shown in Figs. 8, 9 and 10. When this is done, and also in cases where freedom from distortion of the output voltage waveform is especially desired, it may be advisable to wind the two sections with the control windings 4 in such a way that the fluxes go in opposite directions in the two sections. This may be done by crossing the windings as illustrated or by winding the two sections separately and connecting them in opposite senses. Such a dual control winding is very effective in reducing distortions with A. C. current in the control circuit, with the output either single or three phase.

Figs. 9 and 10 show a generator according to the schematic showing of Fig. 8, wherein the rotating field 1 is carried by a shaft 21 journaled for rotation on bearings 22, and has opposite end caps 23 and 24 mounting on inner sleeve 25 of for example multiple, flat-sided form on which the magnets 26 are positioned by means including the bolts 27. Two stator sections 28 are provided, being secured to the generator housing inner wall as by screws 29.

I claim:

1. In a generator, a rotating field structure, and stationary armature means divided into at least two separate sections, each of said armature sections consisting of magnetic material formed to provide teeth for collecting magnetic flux produced by said field structure and further magnetic material behind said teeth forming a continuous reentrant path for field-produced flux to and from said teeth, means including an electric current conducting control winding for each of said armature sections associated with the reentrant path thereof for producing varying degrees of saturation therein, said control windings being wound in opposition to each other, and means controlled by the output voltage of said generator for providing a control current in said control windings.

2. A dynamoelectric generator having a field structure and an armature wherein said armature provides two paths for magnetic flow, the first of said paths being from said field structure into said armature and back again into said field structure, a power winding associated with said first path to generate an output voltage, the second of said paths including a substantial part of the material of said armature re-entrant upon itself in a closed magnetic circuit, a control winding associated with said second path, and means for applying an alternating control current for the output voltage to said control winding, whereby said armature can be controllably saturated in both of said first and second paths with the saturation in said second path controlling the magnetic permeability of said first path and hence the voltage generated in said power winding, said means including means correcting for phase displacement between said output voltage and the control current.

3. In a generator, a field structure, and an armature having teeth formed of magnetic material for collecting magnetic flux produced by said field structure and further magnetic material behind said teeth forming a continuous reentrant path for such flux toward and away from groups of said teeth, a power winding for generating an output voltage positioned in certain of the slots between said teeth, and a control winding positioned in other of the slots between said teeth for conducting an electrical control current to be applied to said further material for producing varying degrees of saturation in said path as the control current is varied, whereby the capacity of said path to conduct flux originating in said field structure can be controlled by control of the current in said control winding.

4. A dynamoelectric generator having a field structure and an armature structure providing two paths for magnetic flow, the first of said paths being from said field structure into said armature structure and back again into said field structure, the second of said paths including a substantial part of the material of said armature structure re-entrant upon itself in a closed magnetic circuit, a power winding associated with said first path for generating an output voltage, a control winding associated with said second path whereby said armature structure can be controllably saturated in both said second path and said first path with the saturation in said second path controlling the magnetic permeability thereof and hence the output voltage generated in said power winding, and control circuit means coupling said control winding to the output voltage and including accelerating means producing an output varying greater than the input thereto to thereby accelerate the response of said control circuit means to variations in the output voltage.

5. In a generator, a field structure, an armature structure having independent sections, at least one of said structures being mounted for rotation relative to the other thereof, said armature sections being formed of magnetic material and each of said sections having teeth for collecting magnetic flux produced by said field structure and a continuous re-entrant path behind said teeth for field produced flux, and control means including an electric current conducting control winding for each of said armature sections associated with the re-entrant path thereof for producing varying degrees of saturation therein, the control windings associated with the different armature sections being wound in opposition to each other.

6. In a generator, a field structure, an armature structure, one of said field and armature structures being mounted for rotation about a predetermined axis and said structures being spaced apart along said axis with their working faces lying in substantially parallel planes extending at substantially right angles to said axis, whereby to provide an axial air gap between the working faces of said structures, said armature structure having teeth formed of magnetic material for collecting magnetic flux produced by said field structure and further magnetic material behind said teeth forming a continuous re-entrant path for said flux toward and away from groups of said teeth, an electrical current conducting control winding associated with said re-entrant path for causing magnetic flux to flow in said path and producing varying degrees of saturation in said path as the current in said control winding is varied, whereby the capacity of said path to conduct flux originating in said field structure can be controlled by control of the current in said control winding, and means coupling the generator output to said control winding and including accelerating means providing an output varying greater than the input thereto to thereby accelerate the response of said coupling means to variations in the generator output.

7. A dynamoelectric generator having a field structure and an armature structure wherein said armature structure provides two paths for magnetic flow, the first of said paths being from said field structure into said armature structure and back again into said field structure, a power winding associated with said first path to generate an output voltage, the second of said paths including a substantial part of the material of said armature structure re-entrant upon itself in a closed magnetic circuit, a control winding associated with said second path, and means providing an alternating control current in said control winding substantially in phase with the output voltage of said generator.

8. In a generator, a permanent magnet field structure providing a low resistance current path around the permanent magnets thereof, an armature structure providing two paths for magnetic flow, the first of said paths being from said field structure into said armature structure and back again into said field structure, a power winding associated with said first path to generate an output voltage, the second of said paths including a substantial part of the material of said armature structure re-entrant upon itself in a closed magnetic circuit, a control winding associated with said second path, and means for applying an alternating control current to said control winding.

References Cited in the file of this patent

UNITED STATES PATENTS

| | | |
|---|---|---|
| 1,685,970 | Townend et al. | Oct. 2, 1928 |
| 1,736,618 | Nickle | Nov. 19, 1929 |
| 2,218,859 | Schweitzer | Oct. 22, 1940 |
| 2,564,320 | Brainard | Aug. 14, 1951 |